Aug. 13, 1946.  G. ELWERT  2,405,878
AIRCRAFT RAMP OPERATING MEANS
Filed March 13, 1944  3 Sheets-Sheet 1

INVENTOR
GEORGE ELWERT.

BY John P. Tarbox
ATTORNEY

INVENTOR
GEORGE ELWERT
BY John P. Tarbox
ATTORNEY

Aug. 13, 1946.   G. ELWERT   2,405,878
AIRCRAFT RAMP OPERATING MEANS
Filed March 13, 1944   3 Sheets-Sheet 3

INVENTOR
GEORGE ELWERT.
BY John P. Tarbox
ATTORNEY

Patented Aug. 13, 1946

2,405,878

UNITED STATES PATENT OFFICE 2,405,878

AIRCRAFT RAMP OPERATING MEANS

George Elwert, Conshohocken, Pa., assignor to Edward G. Budd Manufacturing Company, Philadelphia, Pa., a corporation of Pennsylvania Application March 13, 1944, Serial No. 526,228

8 Claims. (Cl. 244—137)

1

This invention relates to aircraft ramp operating means and has for an object the provision of improvements in this art.

One of the particular objects of the invention is to provide ramp-operating means which has a positive action in both directions of movement of the ramp.

Another object is to provide a strut-supporting joint which will permit free movement of the strut even if the ramp and body support are twisted somewhat out of true alignment.

Another object is to provide a strut-supporting joint which will permit full movement of telescopic screw parts with proper guidance of the parts and full protection of the screw parts from dust and dirt.

Another object is to provide drive and support mountings on the ramp which will permit free movement of the struts even though somewhat misaligned.

Another object is to provide drive and support mountings which will permit the use of identical telescopic strut screw devices on both sides of the ramp.

Another object is to provide ramp-operating drive means which is housed between the floor and airfoil skin cover of the ramp.

Another object is to provide convenient manual means for operating the ramp in case the motor drive fails.

Another object is to provide convenient means for quickly disconnecting the ramp-operating strut from its body support.

The above and other objects and advantages of the invention will be apparent from the following description of an exemplary embodiment thereof, reference being made to the accompanying drawings, wherein.

Figure 1:
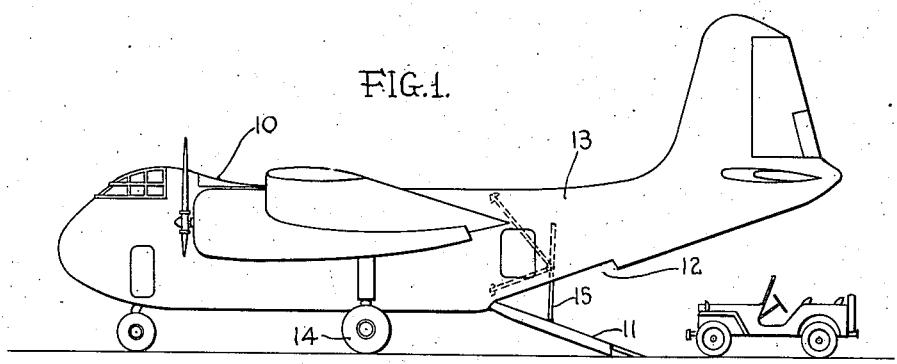
Figure 1 is a side elevation of an airplane having a ramp operated by the present operating mechanism, the ramp being shown in lowered position.
Figure 2:
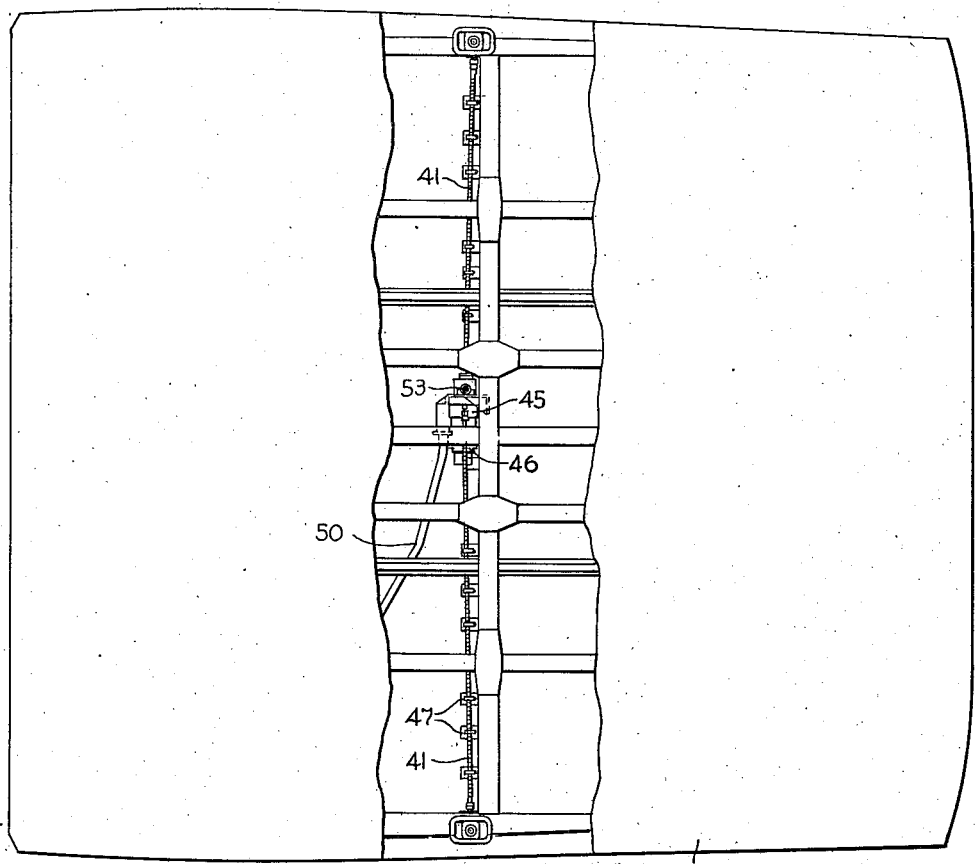
Figure 2 is a plan view of the ramp, the floor being cut away to show the ramp operating means therebelow.
Figure 3:
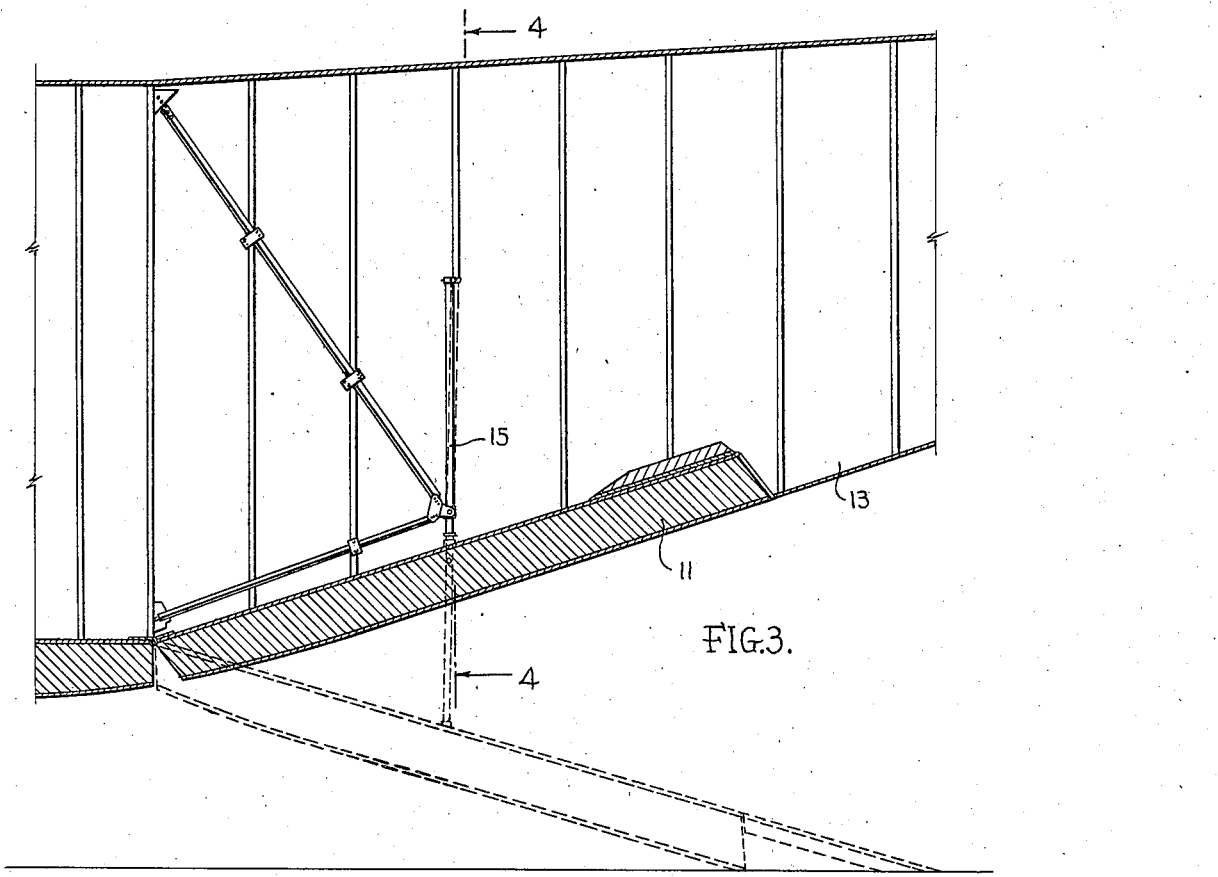
Figure 3 is a side elevation of the ramp strut hoist mechanism.
Figure 4:
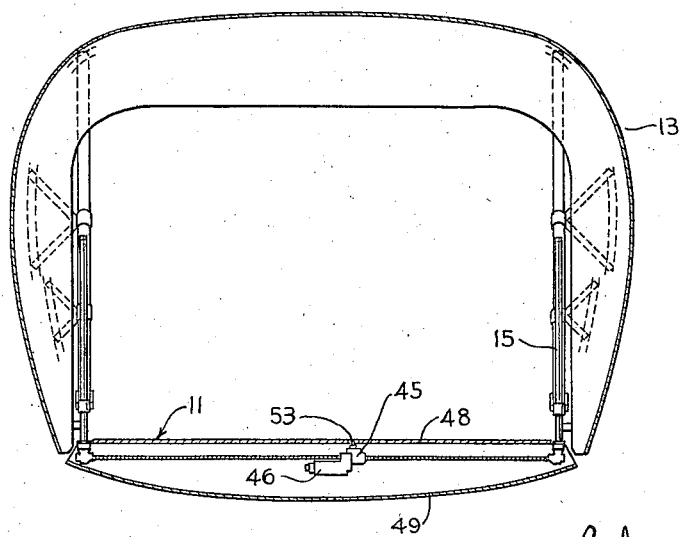
Figure 4 is a vertical section taken on the line 4—4 of Figure 3.

Referring to Figure 1, an airplane 10 is pro-

2 vided with a ramp 11 hinged at the front end and adapted to be lowered, as shown, for loading cargo or to be drawn up to close the opening 12 in the bottom of the fuselage 13 of the airplane.

Means are provided for raising and lowering the ramp and preferably this means will be capable of exerting a lift upon the rear end of the fuselage to prevent tipping about the wheels 14 during loading. As shown, the ramp operating mechanism comprises on each side a telescopic strut device 15 which is hinged to the ramp and to the side wall of the fuselage.

Figure 5:
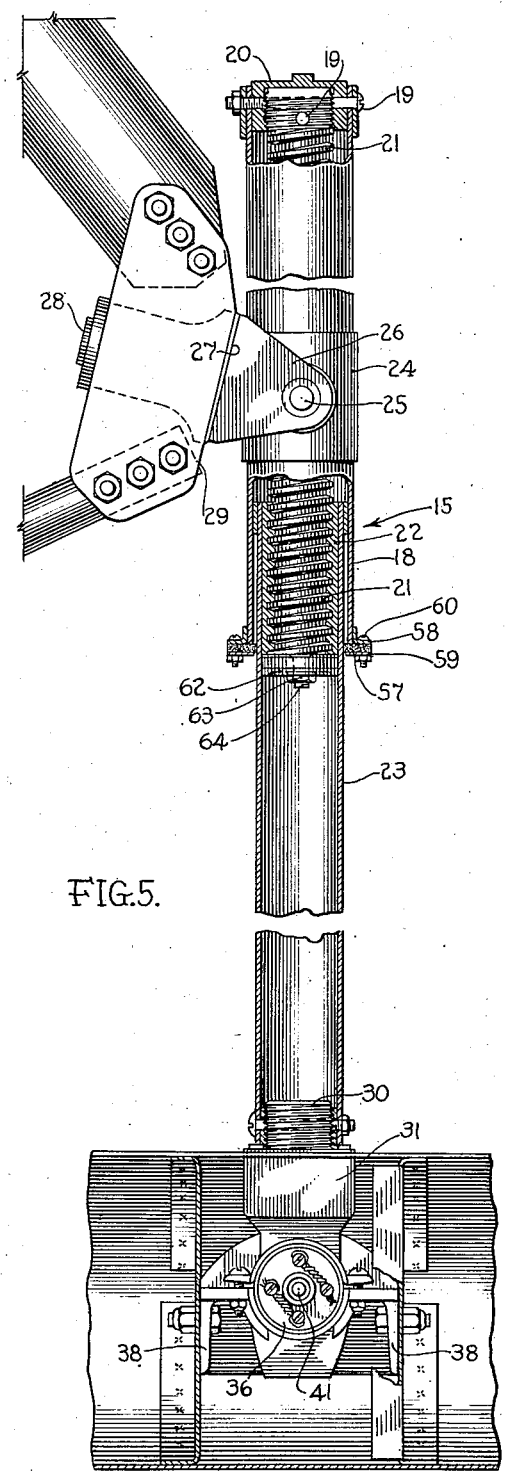
Figure 5 is an enlarged elevation and section of the operating mechanism shown in Figure 3.

As shown in Figure 5, the strut device 15 comprises an outer non-rotating sleeve 18, which at its upper end through bolts 19 and a cap 20 is secured to an inner screw-threaded strut member 21. The inner member or screw 21 is threaded into a bushing 22 secured to the interior of the upper end of an intermediate rotatable sleeve member 23.

The outer sleeve member 18 is provided with a collar 24 firmly fixed thereto, which collar carries on each side a pivot pin 25 which fits in a bearing of a furcation 26 of a yoke 27. The yoke 27 is turnably mounted through its stub shaft 28 in a bearing carried by a bracket 29 secured to the side of the fuselage.

At its lower end the intermediate sleeve 23 has rigidly secured thereto a thrust stub shaft 30 which rotates in a pivoted yoke 31.

The yoke 31 is provided on each side with tubular stub shafts which are turnably mounted in fixed bearing members 36, 37 secured to the ramp, as by brackets 38.

Upon the lower end of the stub shaft 30 there is secured a bevel gear 39 which meshes with and is driven by a bevel pinion 40 secured on a power drive shaft 41. The drive shaft 41 is rotatably mounted within one or both of the turnable tubular stub shafts and extends to the gear box 45 of a drive motor 46 mounted near the center of the ramp. The sheath of the shaft 41 is designated with the shaft numeral, although it does not rotate. The shaft is preferably flexible to accommodate any weave in the ramp and is supported at spaced points by fixed brackets 47.

The motor 46, gear box 45, shafts 41 and the bevel gear drive devices are mounted between the floor 48 and the airfoil skin cover 49 of the ramp. Preferably an electric motor is used and its power cable 50 extends across the hinge line of the ramp to a source of current supply on the fuselage.

Means are provided for operating the ramp by hand if the power device fails, the means here shown comprising a manual drive shaft 53 accessible from above the floor of the ramp and operably connected to gearing inside the gear case 45. A removable cover provides access to the shaft 53 for a suitable hand crank, not shown.

The ramp may be completely disconnected from the fuselage by removing the bolts 19 between the screw 21 and the cap 20 of the sleeve 18.

Figure 7:
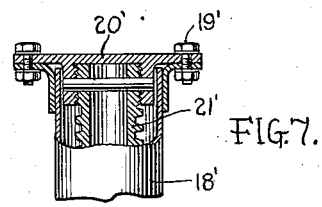
Figure 7 shows a modified cap structure.
Figure 6:
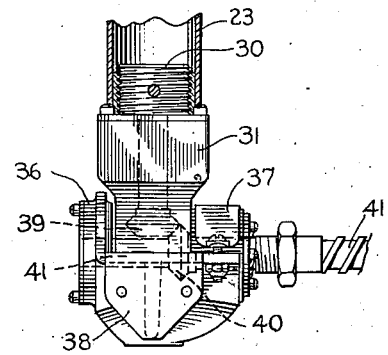
Figure 6 is a side elevation of the lower part of Figure 5.

In Figure 7 there is shown an alternative arrangement wherein the screws 19' are disposed axially of the strut whereby separation may be easily effected regardless of the load on the struts. Related parts are indicated by the same numerals with a prime.

The lower end of the outer sleeve 18 is provided with a felt wiper 57 secured thereto by a flange 58, a washer 59, and bolts 60, the wiper rubbing against the outside of the intermediate sleeve 23 to keep it clean.

The lower end of the screw 21 is provided with a guide cap 62 fitting within the intermediate tube 23, the cap being secured by a nut 63 on a stud 64 on the screw. The cap 62 stops against the end of the threaded bushing 22 of the intermediate sleeve 23.

The operation of the device will be evident from the above description. It will be seen that the movement of the ramp is positive in both directions and that the rigid connection is capable of furnishing support to the rear end of the fuselage when the ramp is down.

While one embodiment of the invention has been described it is to be understood that it may have various embodiments within the limits of the prior art and the scope of the subjoined claims.

What is claimed is:

1. In an aircraft in combination, a fuselage, a floor-covered ramp hinged at one end to the fuselage, means on the ramp and fuselage at a distance from the hinge line for supporting the ramp from the fuselage, and means on said ramp operating through said ramp-supporting means for lowering and raising the ramp about its hinge line, said ramp-operating means including a power drive motor beneath the floor of the ramp and a manual auxiliary operating element accessible through the floor.

2. In an aircraft in combination, a fuselage having a bottom ramp opening in its lower portion, a ramp hinged at one end to the fuselage at one end of the opening, means on the sides of the ramp and along the sides of the opening at a distance from the hinge line for supporting the ramp from the fuselage, and means operating through said ramp-supporting means for lowering and raising the ramp about its hinge line, said supporting means comprising telescopic struts secured at hinged joints to the ramp and fuselage, said ramp-supporting means comprising an outer tube hinged on the sides to the fuselage, a threaded rod disconnectibly bolted at its upper end to said outer tube, and an inner tube threaded to said rod within the outer tube and hinged at its lower end to the ramp.

3. In an aircraft in combination, a fuselage, a ramp hinged at one end to the fuselage, and a telescopic strut hinged to the ramp and fuselage for operating the ramp about its hinge line, said strut comprising an intermediate telescopic member hinged at its lower end to the ramp, an outer telescopic member hinged near its lower end to the fuselage, and an inner telescopic member secured at its upper end to the upper end of said outer telescopic member.

4. Apparatus as set forth in claim 3, further characterized by the fact that said outer telescopic member is hinged to a yoke which is hinged to the fuselage to turn about an axis at an angle to the first hinge line.

5. In an aircraft in combination, a fuselage, a ramp hinged to said fuselage, ramp supporting means secured to the fuselage and ramp for raising and lowering the ramp relative to the fuselage, power means on the ramp for operating said ramp supporting means, and auxiliary hand operated means on the ramp for operating the ramp supporting means.

6. In an aircraft in combination, a fuselage, a ramp hinged to said fuselage, ramp supporting means secured to the fuselage and ramp for raising and lowering the ramp relative to the fuselage, said ramp supporting means comprising three telescopic strut members, one pivoted to the fuselage, one pivoted to the ramp, and one disposed interiorly and screw threaded to another, the outer strut members presenting smooth surfaces, and means for operating said struts.

7. Apparatus as set forth in claim 6, further including a guide head on the screw threaded strut member beyond the threaded connection with the adjacent strut member, the guide head serving to hold the end of its strut in position relative to the adjacent strut member in all operated positions.

8. In an aircraft in combination, a fuselage having an opening in the bottom, a ramp hinged at one end in said opening, and ramp operating strut means connected to a side of the ramp and the side of the fuselage, said strut means being pivoted to the fuselage and ramp for axial movement relative thereto and also being pivoted for lateral movement between the ramp and fuselage.

GEORGE ELWERT.